United States Patent
Morioka

(10) Patent No.: US 11,272,444 B2
(45) Date of Patent: Mar. 8, 2022

(54) COMMUNICATION APPARATUS AND COMMUNICATION METHOD FOR ESTABLISHING PROTECTION AREAS FOR DOWNLINK COMMUNICATIONS

(71) Applicant: Sony Corporation, Tokyo (JP)

(72) Inventor: Yuichi Morioka, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/966,039

(22) PCT Filed: Dec. 10, 2018

(86) PCT No.: PCT/JP2018/045318
§ 371 (c)(1),
(2) Date: Jul. 30, 2020

(87) PCT Pub. No.: WO2019/155753
PCT Pub. Date: Aug. 15, 2019

(65) Prior Publication Data
US 2020/0367156 A1    Nov. 19, 2020

(30) Foreign Application Priority Data

Feb. 7, 2018 (JP) .............................. JP2018-019807

(51) Int. Cl.
*H04W 48/20* (2009.01)
*H04B 17/336* (2015.01)
(Continued)

(52) U.S. Cl.
CPC .......... *H04W 48/20* (2013.01); *H04B 17/336* (2015.01); *H04W 24/10* (2013.01); *H04W 72/0466* (2013.01)

(58) Field of Classification Search
CPC ..... H04W 16/10; H04W 48/20; H04W 24/10; H04W 24/02; H04W 84/12;
(Continued)

(56) References Cited

U.S. PATENT DOCUMENTS

2017/0181102 A1* 6/2017 Bharadwaj ............ H04W 52/10
2017/0308710 A1* 10/2017 Du ........................ G06F 21/606

FOREIGN PATENT DOCUMENTS

CA          3002694 A1     4/2017
JP       2006-340008 A    12/2006
(Continued)

OTHER PUBLICATIONS

International Search Report and Written Opinion dated Feb. 26, 2019 for PCT/JP2018/045318 filed on Dec. 10, 2018, 10 pages including English Translation of the International Search Report.

*Primary Examiner* — Peter Chen
(74) *Attorney, Agent, or Firm* — Xsensus LLP

(57) ABSTRACT

Provided is a communication apparatus and a communication method that avoid mutual interference between networks.
The communication apparatus includes a communication section and a control section. The communication section sends and receives wireless frames. The control section controls transmission and reception of frames. The control section controls transmission, to one or more target stations and with a transmission parameter (transmission power) specified for each target station, of a trigger frame that induces transmission of a transmission refrainment frame. The communication apparatus functions as a base station, and the control section selects, as target stations, one or more subordinate terminals to which a downlink signal is to be sent and controls the transmission of the trigger frame ahead of the transmission of the downlink signal.

6 Claims, 6 Drawing Sheets

(51) Int. Cl.
*H04W 24/10* (2009.01)
*H04W 72/04* (2009.01)

(58) Field of Classification Search
CPC ............. H04W 74/002; H04W 74/006; H04W 74/0816; H04W 74/04; H04W 72/042; H04W 72/0473; H04W 72/0466; H04W 72/1231; H04W 72/0426; H04B 17/336; H04B 17/345
See application file for complete search history.

(56) References Cited

FOREIGN PATENT DOCUMENTS

| | | |
|---|---|---|
| JP | 2007-028666 A | 2/2007 |
| JP | 2016-019239 A | 2/2016 |
| JP | 2016-537905 A | 12/2016 |
| JP | 2018-501730 A | 1/2018 |

\* cited by examiner

COMMUNICATION APPARATUS AND COMMUNICATION METHOD FOR ESTABLISHING PROTECTION AREAS FOR DOWNLINK COMMUNICATIONS

CROSS-REFERENCE TO RELATED APPLICATIONS

The present application is based on PCT filing PCT/JP2018/045318, filed Dec. 10, 2018, which claims priority to JP 2018-019807, filed Feb. 7, 2018, the entire contents of each are incorporated herein by reference.

TECHNICAL FIELD

The technology disclosed in the present specification relates to a communication apparatus and a communication method that avoid mutual interference between networks.

BACKGROUND ART

Recent years have seen a plurality of wireless base stations (access points: APs) for home use sold in a bundle as wireless LAN (Local Area Network) systems typified by IEEE802.11 have become pervasive, resulting, in some cases, in installation of a plurality of APs in homes. Although a single AP is not enough to deliver radio waves to every corner of the house, installing a plurality of APs allows for wireless connection from any place in the house. That is, a terminal needs only to connect to the nearest AP, thus holding promise for reducing the transmission distance between transmission and reception and contributing to improved frequency utilization efficiency. In a densely populated network environment such as that in which a plurality of APs coexists in a single space, however, operation of each network independently of other networks leads to increased mutual interference.

For example, a proposal has been made regarding a wireless communication system in which a master base station collects traffic information and channel information of terminals in a cooperative BSS (Basic Service Set) group and assigns wireless resources on the basis of traffic information and channel information of each terminal in such a manner as to provide an improved communication quality index to each cooperative BSS group (refer, for example, to PTL 1).

Also, in order to reduce interference in a network environment including a plurality of BSSs developed with high density, a proposal has been made regarding a system for a highly efficient wireless (HEW) access point (AP) cooperative protocol that allows for cooperation of one or a plurality of dimensions including time, frequency, space, and power between an AP and STAs (refer, for example, to PTL 2).

For example, it is possible to reduce mutual interference by coordinating schedules or controlling transmission power through cooperation between a plurality of APs installed in a home or a plurality of BSSs. However, it is difficult to reduce mutual interference between APs that are unable to cooperate with each other such as those installed in different homes.

CITATION LIST

Patent Literature

[PTL 1]
   Japanese Patent Laid-Open No. 2016-19239
[PTL 1]
   Japanese Patent Laid-Open No. 2016-537905

SUMMARY

Technical Problem

It is an object of the technology disclosed in the present specification to provide a communication apparatus and a communication method that avoid mutual interference between networks.

Solution to Problem

The technology disclosed in the present specification has been devised in consideration of the above problem, and a first aspect thereof is a communication apparatus that includes a communication section and a control section. The communication section sends and receives wireless frames. The control section controls transmission and reception of frames. The control section controls transmission, to one or more target stations and with a transmission parameter specified for each target station, of a trigger frame that induces transmission of a transmission refrainment frame.

The control section determines, as a transmission parameter for each target station, transmission power that allows the transmission refrainment frame to reach an interference source. The control section selects a transmission destination of a data frame as a target station and causes the trigger frame to be sent ahead of transmission of the data frame.

Also, the communication apparatus functions as a base station. The control section selects one or more subordinate terminals to which a downlink signal is to be sent as target stations and causes the trigger frame to be sent ahead of the transmission of the downlink signal.

Also, a second aspect of the technology disclosed in the present specification is a communication method that includes a step of selecting a target station to which to request transmission of a transmission refrainment frame, a step of determining a transmission parameter regarding the transmission refrainment frame for each target station, and a step of sending, to the target station, a trigger frame that induces the transmission of a transmission refrainment frame with the determined transmission parameter.

Also, a third aspect of the technology disclosed in the present specification is a communication apparatus that includes a communication section and a control section. The communication section sends and receives wireless frames. The control section controls transmission and reception of frames. The control section causes, in response to reception of a trigger frame that induces transmission of a transmission refrainment frame, the transmission refrainment frame to be sent with a transmission parameter specified by the trigger frame.

The control section causes a transmission refrainment frame to be sent with transmission power specified as a transmission parameter or in such a manner as to achieve a reach range specified as a transmission parameter.

Also, the communication apparatus functions as a subordinate terminal of a base station, and the control section causes a transmission refrainment frame to be sent in response to the trigger frame received from the base station.

A fourth aspect of the technology disclosed in the present specification is a communication method that includes a step of receiving a trigger frame that induces transmission of a transmission refrainment frame and a step of sending a transmission refrainment frame with a transmission parameter specified by the trigger frame.

Advantageous Effects of Invention

The technology disclosed in the present specification can provide a communication apparatus and a communication method that streamlines downlink communication by avoiding mutual interference between networks.

It should be noted that the effect described in the present specification is merely illustrative and that effects of the present invention are not limited thereto. Also, the present invention may bring about further additional effects in addition to the above effect.

Still other objects, features, and advantages of the technology disclosed in the present specification will become apparent from detailed description based on embodiments described later and attached drawings.

DESCRIPTION OF EMBODIMENT

A detailed description will be given below of an embodiment of the technology disclosed in the present specification with reference to drawings.

As wireless LAN systems typified by IEEE802.11 have become pervasive, a plurality of wireless base stations may be sold in a bundle and a plurality of APs may be installed in homes. While reducing the transmission distance between transmission and reception and contributing to improved frequency utilization efficiency, the coexistence of a plurality of APs in a single space as described above raises concern over possible increase in mutual interference between networks.

For example, it is possible to reduce mutual interference by coordinating schedules or controlling transmission power through cooperation between a plurality of APs installed in a home or a plurality of BSSs. However, it is difficult to reduce mutual interference between APs that are unable to cooperate with each other such as those installed in different homes. Increased mutual interference leads to reduced communication efficiency and frequency utilization efficiency.

Also, in an infrastructure communication mode in which one or more terminals (STAtions: STAs) operate under an AP, transmission demand is generally higher in downlink communication than in uplink communication.

For this reason, the present specification proposes below a wireless communication technology that contributes to improved frequency utilization efficiency by streamlining downlink communication having higher transmission demand in a densely populated network environment. The wireless communication technology disclosed in the present specification is suitably applicable not only to a communication environment where networks cooperating with each other are densely populated but also to a communication environment where networks unable to cooperate with each other coexist, thus streamlining downlink communication having higher transmission demand and contributing to improved frequency utilization efficiency.

Figure 1:
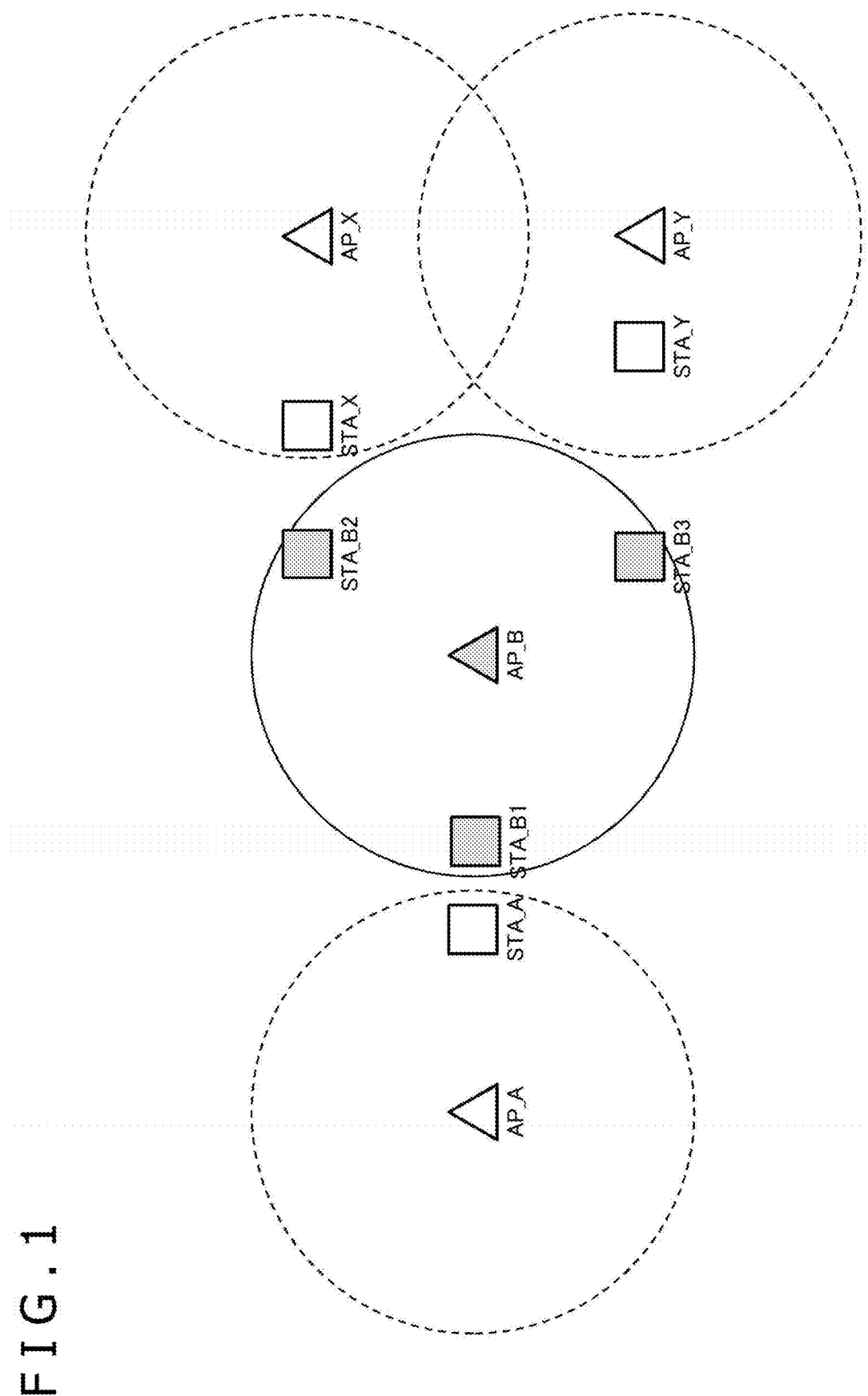
FIG. 1 is a diagram illustrating a communication environment to which the technology disclosed in the present specification is applied.

Here, a communication environment (multi-AP environment) where a plurality of APs exists as illustrated in FIG. 1 is considered. A plurality of APs, namely, AP_A, AP_B, AP_X, and AP_Y, coexists in the communication environment illustrated, and the networks (BSSs) established by the respective APs partially overlap with each other.

Of the plurality of these APs, the AP_A and the AP_B cooperate with each other. For example, the AP_A and the AP_B have been sold in a bundle and installed in a home. Therefore, the AP_A network and the AP_B network can avoid mutual interference by coordinating transmission schedules and controlling the transmission power. That is, the AP_A network does not constitute an interference source for the AP_B network.

Also, the AP_X and the AP_Y do not cooperate with the AP_B. For example, the AP_X and the AP_X are not products sold in a bundle with the AP_B. For example, it is imaginable that radio waves output from the AP_X and the AP_Y installed in the house next door penetrate through walls and reach the AP_B network. For this reason, the AP_X and AP_Y networks constitute interference sources for the AP_B network.

Here, three terminals STA_B1, STA_B2, and STA_B3, are connected to the AP_B. Also, a terminal STA_A is connected to the AP_A that cooperates with the AP_B. In the example illustrated, the STA_A is located near the STA_B1, a subordinate terminal of the AP_B. The STA_A and the STA_B1 are located within their communication ranges, and therefore, mutual interference can take place. However, when the AP_B wishes to communicate with the STA_B1, its subordinate terminal, the AP_B can avoid interference by coordinating schedules with the AP_A. It should be noted that when the AP_A wishes to communicate with the STA_A, its subordinate terminal, the AP_A can similarly avoid interference by coordinating schedules with the neighboring cooperative network.

On the other hand, terminals STA_X and STA_Y are connected, respectively, to the AP_X and the AP_Y that constitute interference sources for the AP_B network. In the example illustrated, the STA_X is located near the terminal STA_B2, a subordinate terminal of the AP_B, and the STA_Y is located near the terminal STA_B3, a subordinate terminal of the AP_B. For this reason, the STA_B2 and the STA_X are located within their communication ranges, and therefore, mutual interference can take place, and the STA_B3 and the STA_Y are located within their communication ranges, and therefore, mutual interference can take place.

The case where the AP_B wishes to send a downlink signal to each of the subordinate terminals STA_B1, STA_B2, and STA 3 is now investigated.

The STA_A and the STA_B1 are located within their communication ranges, and therefore, mutual interference can take place. However, it is possible to avoid mutual interference through schedule coordination between the AP_A and the AP_B that cooperate with each other. When the AP_B wishes to send a downlink signal to the STA_B1, its subordinate terminal, it is possible to avoid interference through schedule coordination between the two networks such that the AP_A refrains from communicating with the STA_A, its subordinate terminal. Specifically, the AP_B sends a downlink signal to the STA_B1 at a timing when the STA_A does not send any signal on the basis of schedule information within the AP_A network. Alternatively, the AP_A schedules a timing for permitting transmission from the STA_A at a timing when the AP_B does not send any downlink signal to the STA_B1 on the basis of schedule coordination within the AP_B network.

On the other hand, the STA_B2 and the STA_X are located within their communication ranges, and therefore, mutual interference can take place, and the STA_B3 and the STA_Y are located within their communication ranges, and therefore, mutual interference can take place. Also, the AP_B neither cooperates with the AP_X nor with the AP_Y, and therefore it is impossible to avoid mutual interference by coordinating schedules.

For example, an access control sequence based on RTS/CTS (Request to Send/Clear to Send) is employed in IEEE802.11 system and so on. A data sending terminal a sending terminal sends an RTS signal before transmission, and a receiving terminal returns a CTS signal upon receipt of the RTS signal. Then, other terminal that receives at least either an RTS or CTS signal avoids interference by refraining from a transmission action only for the duration of an NAV (Network Allocation Vector: transmission disabled period) included in these signals.

In contrast, the present embodiment has introduced a mechanism that sends, to terminals connected to non-cooperative other networks (networks that constitute interference sources), a transmission refrainment frame for causing the terminals that constitute interference sources to refrain from sending a signal before initiating data transmission, thus reducing mutual interference between networks for higher efficiency of downlink communication and contributing to improved frequency utilization efficiency.

Figure 2:
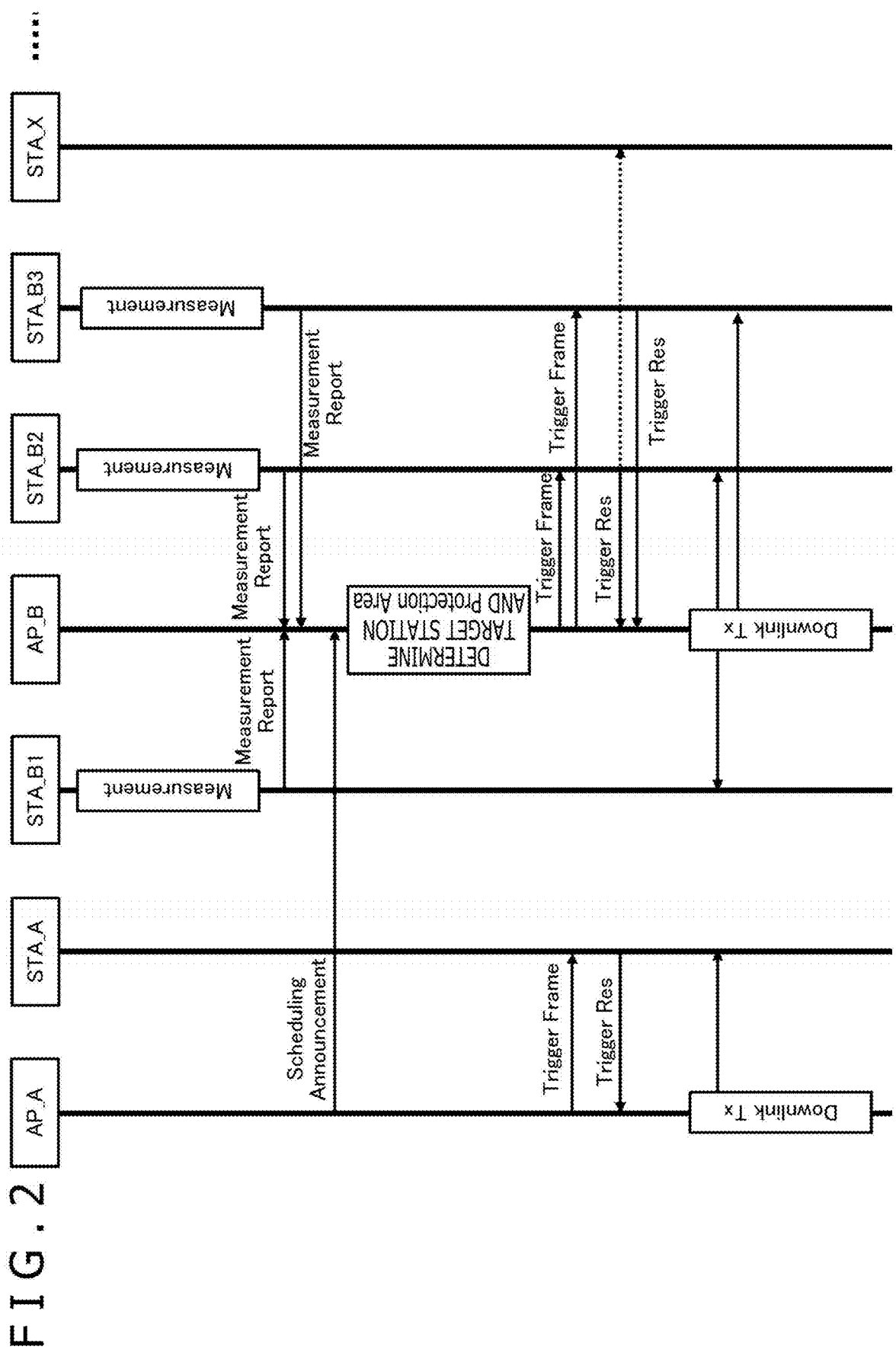
FIG. 2 is a diagram illustrating an example of a communication sequence for carrying out downlink communication in an AP_B network.

FIG. 2 illustrates an example of a communication sequence for the AP_B to carry out downlink communication in the network topology illustrated in FIG. 1.

It is assumed here that the AP_B wishes to send a downlink signal to each of the subordinate terminals STA_B1, STA_B2, and STA_B3. In this case, before the AP_B begins to send a downlink signal, it is necessary to cause the STA_X and the STA_Y that constitute interference sources for each of the STA_B2 and the STA_B3 to refrain from sending signals.

Each of the subordinate terminals of the AP_B, namely, STA_B1, STA_B2, and STA_B3, performs an interference signal measurement (Measurement). Each of the terminals STA_B1, STA_B2, and STA_B3 may perform an interference signal measurement on a regular basis or on the basis of an instruction from the connected AP_B. Each of the terminals STA_B1, STA_B2, and STA_B3 acquires, through measurement, information regarding an interference status such as identification information of the terminal constituting an interference source and information regarding interference power. Terminal identification information includes, for example, MAC (Media Access Control) address and identification information added to a physical header.

The AP_B receives an interference status report (Measurement Report) frame, an interference signal measurement result, from its subordinate terminals STA_B1, STA_B2, and STA_B3 ahead of the downlink signal transmission. The AP_B can acquire, on the basis of the report frame received from the terminal STA_B1, the fact that the STA_B1 is located within a range where a signal can be received from the subordinate terminal STA_A of the cooperative AP_A, interference power received by the STA_B2 from the nearby interference source STA_X, and interference power received by the STA_B3 from the nearby interference source STA_Y. Each of the terminals STA_B1, STA_B2, and STA_B3 may measure reception power of interference signals. Alternatively, each interference signal may include transmission power. On the assumption that all terminals send signals with uniform transmission power, it is possible to estimate the distance to the interference source on the basis of reception power. A measurement result report frame may report a combination of transmission and reception power of an interference signal or an estimated distance to the interference source.

Also, the AP_B receives, from the cooperative AP_A, an information frame regarding traffic scheduling (Scheduling Announcement) as a radio wave utilization status. This scheduling information also includes information regarding a transmission timing of the STA_A, the subordinate terminal of the AP_A. It should be noted that it is assumed that, although not illustrated, the AP_B also sends a Schedulling Announcement frame to the AP_A.

Then, the AP_B determines an area to be reached by a transmission refrainment frame, i.e., a protection area (Protection Area), on the basis of two types of information, namely, a Measurement Report received from each of the subordinate terminals STA_B1, STA_B2, and STA_B3 and a Schedulling Announcement received from the cooperative AP_A. The protection area is determined by the location of the terminal that sends a transmission refrainment frame and the transmission power of the transmission refrainment frame sent therefrom (reach range).

Figure 3:
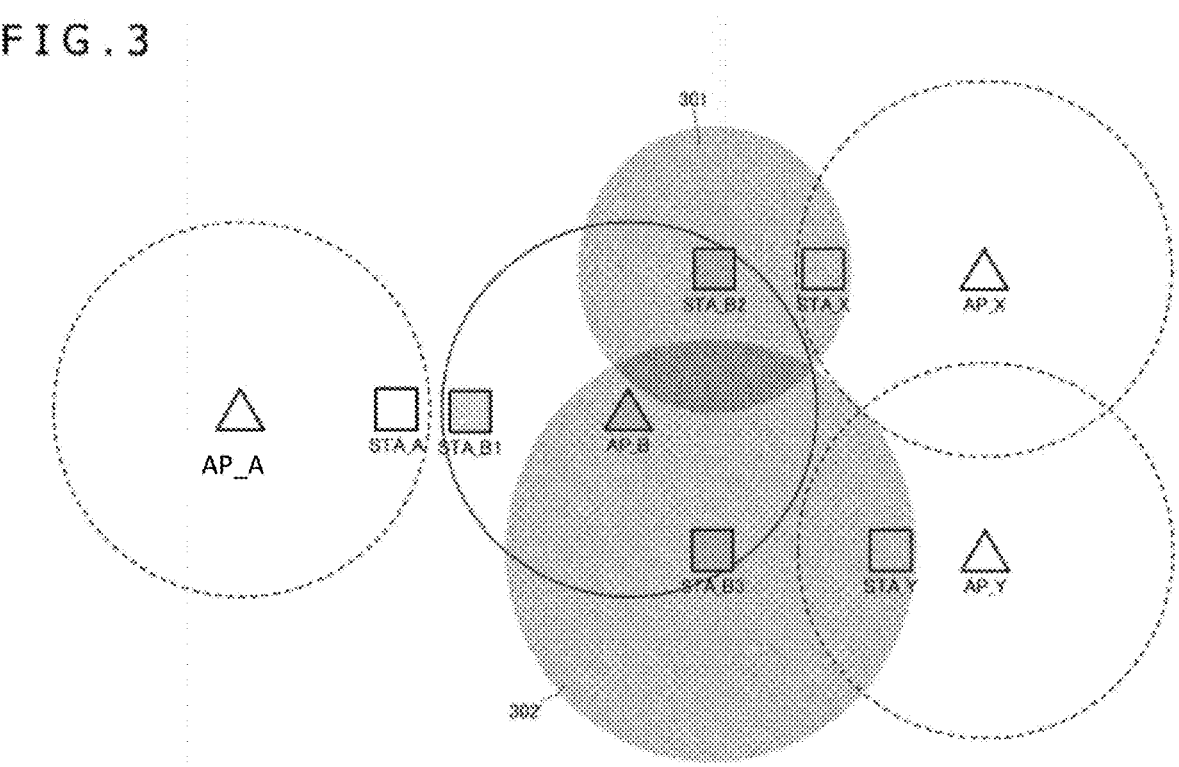
FIG. 3 is a diagram illustrating an example of a protection area determined by the AP_B in the network topology illustrated in FIG. 1.

FIG. 3 illustrates an example of a protection area determined by the AP_B in the network topology illustrated in FIG. 1.

The AP_B finds out, on the basis of the Measurement Report received from the STA_B2, that the interference source STA_X is located relatively far from the STA_B2. For this reason, the AP_B sets a relatively small protection area denoted by reference number 301 for the STA_B2.

Also, the AP_B finds out, on the basis of the Measurement Report received from the STA_B3, that the interference source STA_Y is located relatively close to the STA_B3. For this reason, the AP_B sets a relatively large protection area denoted by reference number 302 for the STA_B3.

Also, the AP_B knows, on the basis of the Schedulling Announcement received from the AP_A, the timing when the STA_A receives a signal from the AP_A (in other words, the timing when the STA_A does not send any signal). Therefore, the AP_B can avoid interference between the STA_B1 and the STA_A by coinciding its downlink signal with that timing. Therefore, the AP_B does not set any protection area for the STA_B1.

A description will follow of the communication sequence for the AP_B to carry out downlink communication with reference to FIG. 2 again.

Thereafter, the AP_B sends, to the terminals STA_B2 and STA_B3 for which protection areas have been set, a trigger frame (Trigger Frame) that induces the transmission of a transmission refrainment frame ahead of the transmission of a downlink signal. A trigger frame specifies a terminal to which to send a transmission refrainment frame and transmission power that allows the terminal to establish an appropriate protection area (in other words, transmission power for achieving a desired reach range of the transmission refrainment frame in question). It should be noted that the trigger frame itself is stipulated in IEEE802.11ax as a frame for enabling uplink channel access.

Each of the terminals STA_B2 and STA_B3 returns, in response to a trigger frame received from the connected AP_B, a trigger response (Trigger Response) to the AP_B with the transmission power specified by the trigger frame. It should be noted that the term "trigger response" here corresponds, for example, to a trigger-based PPDU (PLCP (Physical Layer Convergence Protocol) Protocol Data Unit).

The trigger response sent from the terminal STA_B2 also reaches the interference source STA_X as a transmission refrainment frame, and the trigger response sent from the terminal STA_B3 also reaches the interference source STA_Y as a transmission refrainment frame (not illustrated in FIG. 2).

Each of the terminals STA_X and STA_Y that has received a transmission refrainment frame refrains from performing a transmission action for a predetermined time period (e.g., NAV specified by the transmission refrainment frame).

When a trigger response is received from each of the terminals STA_B2 and STA_B3 to which a trigger frame has been sent, the AP_B sends a downlink signal to each of the subordinate terminals STA_B1, STA_B2, and STA_B3 (Downlink Tx).

During the transmission period of the downlink signal, each of the interference sources STA_X and STA_Y refrains from performing a transmission action, thus allowing for mutual interference to be avoided between the networks and ensuring successful transmission of the downlink signal. Also, the need to impose refraining from transmission over an excessive range can be eliminated as the terminals STA_B2 and STA_B3 set the protection areas 301 and 302 of appropriate sizes by sending transmission refrainment frames with appropriate transmission power. This streamlines downlink communication with higher transmission demand and contributes to improved frequency utilization efficiency.

Figure 4:
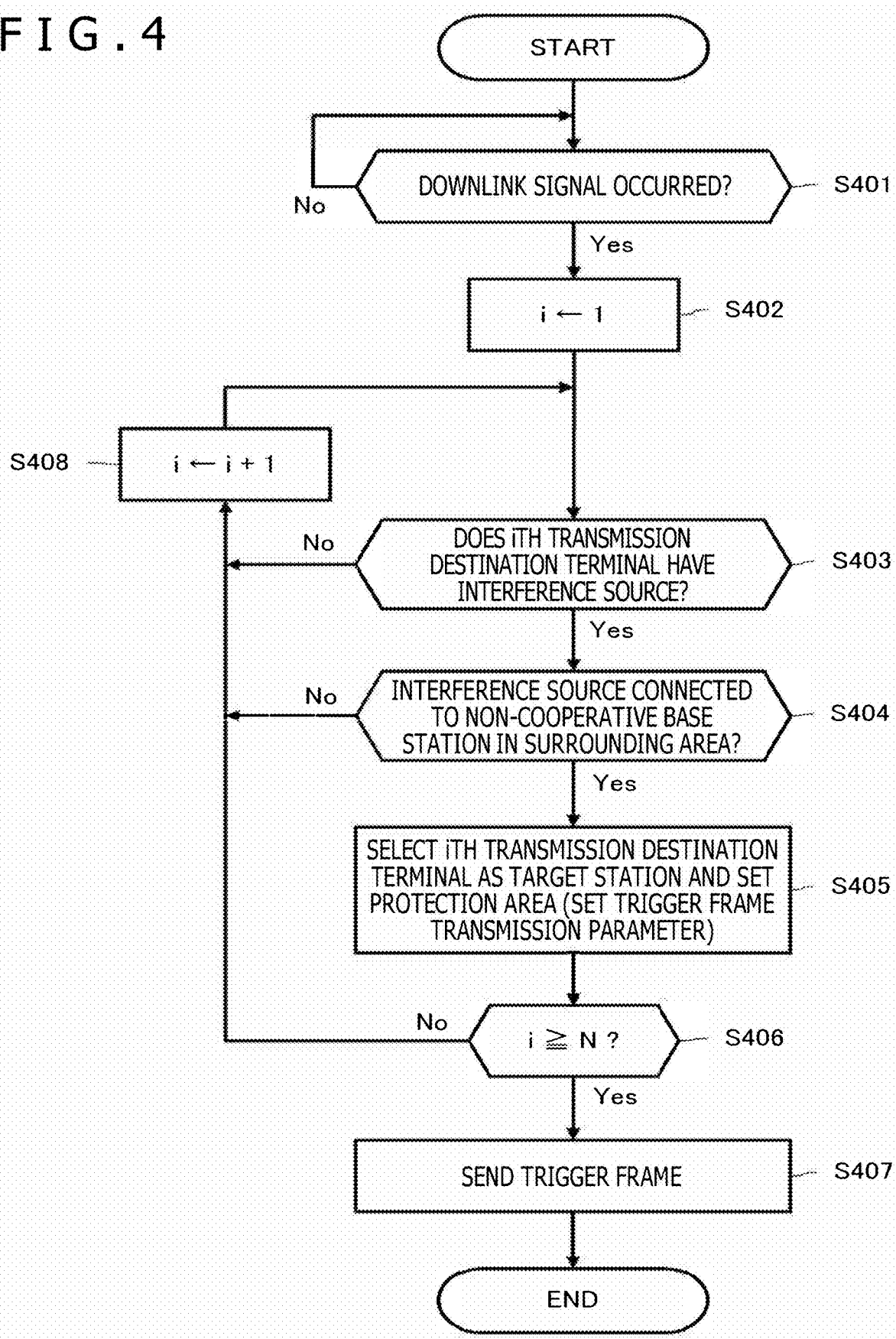
FIG. 4 is a flowchart illustrating an example of a processing procedure for a base station (AP) to send a trigger frame to its subordinate terminal (STA) ahead of transmission of a downlink signal.

FIG. 4 illustrates, in a flowchart form, an example of a processing procedure for a communication apparatus that functions as a base station (AP) to send a trigger frame to its subordinate terminal (STA) ahead of transmission of a downlink signal. It should be noted, however, that it is assumed that the base station has received not only a report (Measurement Report) frame regarding an interference signal measurement result from each of the subordinate terminals but also a scheduling information (Schedulling Announcement) frame from the cooperative base station in the surrounding area before carrying out the processing procedure illustrated.

When a downlink signal (downlink data) to be sent occurs (step S401), the base station selects target stations to which to send a trigger frame (in other words, terminals to which to send a transmission refrainment frame) and sets a transmission parameter for each target station.

Here, 1 is substituted into a variable i first assuming that a downlink signal is sent to N subordinate terminals (step S402).

The base station checks whether the ith transmission destination terminal has an interference source (step S403).

Here, if the ith transmission destination terminal does not have any interference source (No in step S403), there is no possibility that the terminal will receive interference during reception of a downlink signal, thus eliminating the need to send a transmission refrainment frame. For this reason, the base station removes the ith transmission destination terminal from the target stations, increments i by 1 (step S408), and proceeds to the selection of target stations and the setting of a transmission parameter for the (i+1)th transmission destination terminal.

In the case where the ith transmission destination terminal has an interference source (Yes in step S403), the base station further checks whether the interference source of the ith transmission destination terminal is connected to a non-cooperative base station in the surrounding area (step S404).

In the case where the ith transmission destination terminal is not connected to a non-cooperative base station in the surrounding area (No in step S404), in other words, in the case where the ith transmission destination terminal is connected to a cooperative base station in the surrounding area, the base station can avoid interference of a downlink signal to the ith transmission destination terminal through schedule coordination with this base station in the surrounding area, thus eliminating the need to send a transmission refrainment frame. For example, the base station can avoid interference by scheduling a downlink signal transmission timing to the ith transmission destination terminal in such a manner as not to coincide with the transmission timing of this interference source. In the case where an interference source is connected to the cooperative base station in the surrounding area, the interference source becomes no longer an interference source through schedule coordination. For this reason, the base station removes the ith transmission destination terminal from the target stations, increments i by 1 (step S408), and proceeds to the process of selecting target stations for the (i+1)th transmission destination terminal and setting a transmission parameter.

On the other hand, in the case where the interference source of the ith transmission destination terminal is connected to a non-cooperative base station in the surrounding area (Yes in step S404), the base station selects the ith transmission destination terminal as a target station to which to send a trigger frame. Then, the base station sets transmission power for establishing an appropriate protection area as a transmission parameter of a transmission refrainment frame on the basis of the interference status (e.g., interference power information) notified from the ith transmission destination terminal (step S405).

In the case where i is smaller than N, that is, in the case where there is still a terminal that has yet to be processed as a transmission destination of a downlink signal (No in step S406), the base station increments i by 1 (step S408) and proceeds to the process of selecting target stations for the (i+1)th transmission destination terminal and setting a transmission parameter.

Then, when i reaches N, that is, when the selection of target stations and the setting of a transmission parameter are complete for all transmission destination terminals to which to send downlink signals (Yes in step S406), the base station sends a trigger frame that specifies transmission parameters for all the selected target stations (step S407) and terminates the present process.

Figure 5:
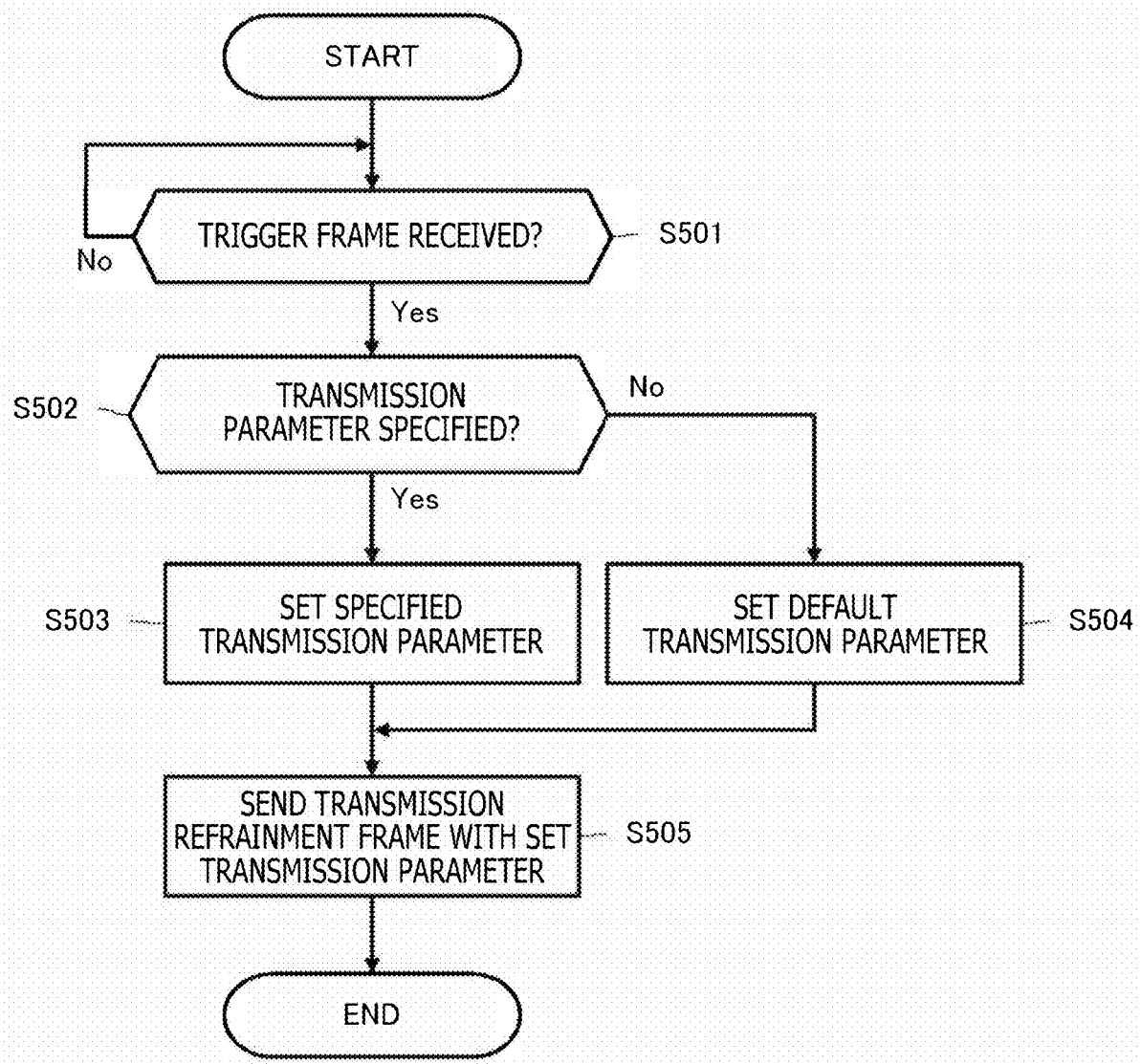
FIG. 5 is a flowchart illustrating an example of a processing procedure for sending a transmission refrainment frame in response to a trigger frame received from the base station (AP) to which the terminal (STA) is connected.

FIG. 5 illustrates, in a flowchart form, an example of a processing procedure for a communication apparatus that functions as a terminal (STA) to send a transmission refrainment frame in response to a trigger frame received from the connected base station (AP). It should be noted that it is assumed that the terminal has carried out a report (Measurement Report) frame regarding an interference signal measurement result to the connected base station before the illustrated processing procedure is initiated.

When a trigger frame including its own address is received from the base station (or inducing the transmission of a transmission refrainment frame to itself) while on standby (Yes in step S501), the terminal checks whether a transmission parameter of a transmission refrainment frame is specified by the trigger frame (step S502).

In the case where a transmission parameter of a transmission refrainment frame such as transmission power is specified by the trigger frame (Yes in step S502), the terminal sets the specified transmission parameter (step S503). Also, in the case where no transmission parameter is specified by the trigger frame, the terminal sets a default transmission parameter (step S504).

Then, the terminal sends a transmission refrainment frame with the set transmission parameter (step S505) and terminates the present process.

Figure 6:
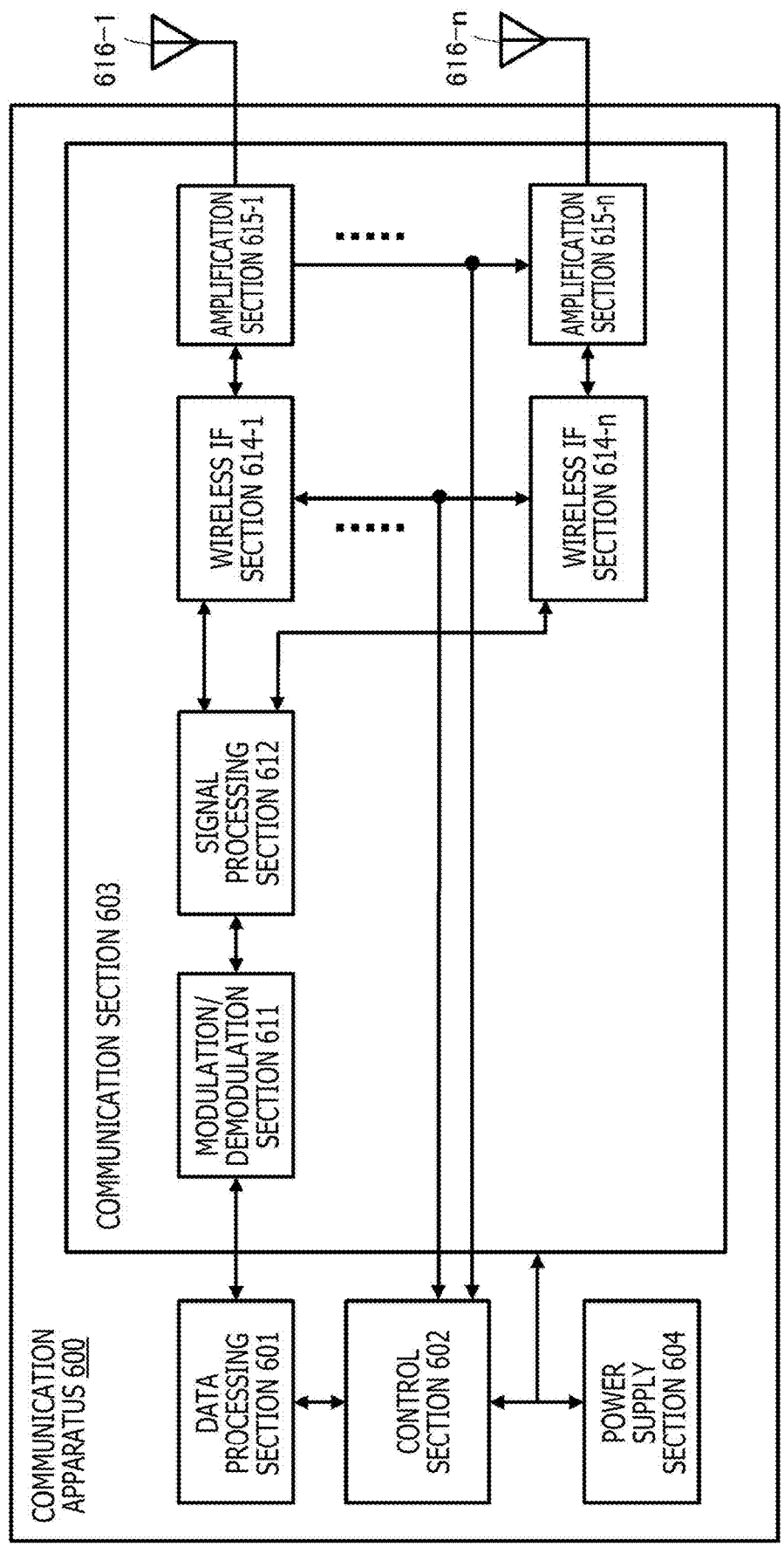
FIG. 6 is a diagram illustrating a configuration example of a communication apparatus 600.

FIG. 6 illustrates a configuration example of a communication apparatus 600 to which the technology disclosed in the present specification is applicable. The communication apparatus 600 can function both as a base station (AP) and a terminal (STA), for example, in the network topology illustrated in FIG. 1.

The communication apparatus 600 includes a data processing section 601, a control section 602, a communication section 603, and a power supply section 604. Also, the communication section 603 further includes a modulation/demodulation section 611, a signal processing section 612, a wireless interface (IF) section 614, and an amplification section 615. An antenna 616 is connected to the amplification section 615. It should be noted that one or more sets of the wireless interface section 614, the amplification section 615, and the antenna 616 may be included as components. Also, the function of the amplification section 615 is included, in some cases, in the wireless interface section 614.

The data processing section 601 generates, at the time of transmission when data is input from a protocol's upper layer (not illustrated), a packet for wireless transmission from the data, performs processes such as adding a header and an error detection code for media access control (MAC), and provides processed data to the modulation/demodulation section 611 in the communication section 603. Conversely, at the time of reception when input is received from the modulation/demodulation section 611, the data processing section 601 performs processes such as analyzing a MAC header, detecting a packet error, and performing a reordering process and provides processed data to its own protocol's upper layer.

The control section 602 controls exchange of information between the different sections of the communication apparatus 600. Also, the control section 602 handles parameter setting in the modulation section 611 and the signal processing section 612 and packet scheduling in the data processing section 601. Also, the control section 602 handles parameter setting and controls transmission power in the wireless interface section 614 and the amplification section 615.

In the case where the communication apparatus 600 functions as a base station, the control section 602 performs processes for improving the frequency utilization efficiency of the system as a whole while at the same time avoiding mutual interference at the time of transmission of a downlink signal.

Specifically, the control section 602 determines, ahead of the transmission of a downlink signal to one or more subordinate terminals, a transmission refrainment area for each terminal on the basis of the interference status of each terminal to which the downlink signal is to be sent and the radio wave utilization status of the cooperative base station in the surrounding area and controls the operation of the communication apparatus 600 to send a trigger frame that induces the transmission of a transmission refrainment frame with the transmission power specified for each terminal such that the transmission refrainment frame reaches into the transmission refrainment area.

Also, in the case where the communication apparatus 600 functions as a terminal, the control section 602 controls, in response to the trigger frame received from the connected base station, the operation of the communication apparatus 600 to send a transmission refrainment frame with the transmission power specified by the trigger frame.

The modulation/demodulation section 611 encodes, interleaves, and modulates, at the time of signal transmission, the input data from the data processing section 601 on the basis of a coding and modulation scheme set by the control section 602, generates a data symbol stream, and provides the stream to the signal processing section 612. Also, the modulation/demodulation section 611 performs, at the time of signal reception, processes opposite to those performed at the time of transmission on the input from the signal processing section 612 and provides the received data to the data processing section 601 or the control section 602.

The signal processing section 612 performs, at the time of signal transmission, signal processing on the input from the modulation/demodulation section 611 and provides one or more transmission symbol streams acquired to the respective wireless interface sections 614. Also, the signal processing section 612 performs, at the time of signal reception, signal processing on received symbol streams input from the respective wireless interface sections 614 and provides the stream to the modulation/demodulation section 611.

It should be noted that the signal processing section 612 performs, as necessary, spatial processing including spatial multiplexing of a plurality of streams at the time of signal transmission and spatial decomposition of a plurality of streams of a received signal at the time of signal reception. For this reason, the signal processing section 612 calculates, from preamble portions and training signal portions of input signals from the respective wireless interface sections 614, complex channel gain information of a propagation path for use for spatial processing.

The wireless interface section 614 converts the input from the signal processing section 612 into an analog signal at the time of signal transmission, performs filtering and upconversion into a carrier frequency, and sends out the signal to the antenna 616 or the amplification section 615. Also, the wireless interface section 614 performs, at the time of signal reception, opposite processes on the input from the antenna 616 or the amplification section 615 and provides the data to the signal processing section 612.

The amplification section 615 amplifies, at the time of signal transmission, the analog signal input from the wireless interface section 614 to a predetermined power level and sends the signal to the antenna 616. Also, the amplification section 615 amplifies, at the time of signal reception, the signal input from the antenna 616 to a predetermined power level with low noise and outputs the signal to the wireless interface section 614. Also, at least either the function of this amplification section 615 at the time of transmission or reception is included, in some cases, in the wireless interface section 614.

The power supply section 604 includes a battery power supply or a stationary power supply and supplies power to the respective sections of the communication apparatus 600.

INDUSTRIAL APPLICABILITY

A detailed description has been given above of the technology disclosed in the present specification with reference to specific embodiments. However, it is apparent that a person skilled in the art can modify or substitute the embodiments in question without departing from the gist of the technology disclosed in the present specification.

The technology disclosed in the present specification is applicable, for example, to wireless networks based on the IEEE802.11 standard. It should be noted, however, that the technology disclosed in the present specification is not limited in scope of application to specific communication standards. It is possible to streamline downlink communication with higher transmission demand and contribute to improved frequency utilization efficiency by applying the technology disclosed in the present specification to a densely populated network environment.

In short, the technology disclosed in the present specification has been described by way of illustration, and the description of the present specification should not be interpreted restrictively. In order to evaluate the gist of the technology disclosed in the present specification, the claims should be taken into consideration.

It should be noted that the technology disclosed in the preset specification can have the following configurations:

(1) A communication apparatus including:
a communication section adapted to send and receive wireless frames; and
a control section adapted to control transmission and reception of frames, in which
the control section controls transmission, to one or more target stations and with a transmission parameter specified for each target station, of a trigger frame that induces transmission of a transmission refrainment frame.

(2) The communication apparatus of feature (1), in which
the control section determines, as a transmission parameter, transmission power of a transmission refrainment frame for each target station.

(3) The communication apparatus of feature (2), in which
the control section determines transmission power of the transmission refrainment frame for each target station on the basis of a status of interference received by the target station.

(4) The communication apparatus of feature (2) or (3), in which
the control section determines, for each target station, transmission power that allows the transmission refrainment frame to reach an interference source.

(5) The communication apparatus of any one of features (1) to (4), in which
the control section selects a transmission destination of a data frame as a target station and causes the trigger frame to be sent ahead of transmission of the data frame.

(6) The communication apparatus of any one of features (1) to (5), in which
the communication apparatus functions as a base station, and
the control section selects, as target stations, one or more subordinate terminals to which a downlink signal is to be sent and controls the transmission of the trigger frame.

(7) The communication apparatus of feature (6), in which
the control section causes the trigger frame to be sent ahead of transmission of the downlink signal.

(8) The communication apparatus of feature (6) or (7), in which
the control section controls the transmission of the trigger frame on the basis of a status of interference of a terminal to which the downlink signal is to be sent and a radio wave utilization status of a base station in a surrounding area.

(9) The communication apparatus of feature (6) or (7), in which
the control section controls the transmission of the trigger frame on the basis of a radio wave utilization status of a base station in a surrounding area of a terminal to which the downlink signal is to be sent.

(10) The communication apparatus of feature (9), in which
the control section does not select, as a target station to which the trigger frame is to be sent, a terminal that receives interference only from an interference source connected to a base station in a surrounding area whose radio wave utilization status can be found out.

(11) The communication apparatus of any one of features (6) to (10), in which
the control section determines, as a transmission parameter for each terminal, a target station, transmission power that allows the transmission refrainment frame to reach an interference source.

(12) A communication method including:
a step of selecting a target station to which to request transmission of a transmission refrainment frame;
a step of determining a transmission parameter regarding the transmission refrainment frame for each target station; and
a step of sending, to the target station, a trigger frame that induces the transmission of a transmission refrainment frame with the determined transmission parameter.

(13) A communication apparatus including:
a communication section adapted to send and receive wireless frames; and
a control section adapted to control transmission and reception of frames, in which
the control section causes, in response to reception of a trigger frame that induces transmission of a transmission refrainment frame, the transmission refrainment frame to be sent with a transmission parameter specified by the trigger frame.

(14) The communication apparatus of feature (13), in which
the control section causes a transmission refrainment frame to be sent with transmission power specified as a transmission parameter or in such a manner as to achieve a reach range specified as a transmission parameter.

(15) The communication apparatus of feature (13) or (14), in which
the communication apparatus functions as a subordinate terminal of a base station, and
the control section sends a transmission refrainment frame in response to the trigger frame received from the base station.

(16) The communication apparatus of feature (15), in which
the control section controls notification of an interference status to the base station.

(17) The communication apparatus of feature (16), in which
the control section causes identification information of an interference source and information regarding interference power to be notified to the base station as an interference status.

(18) The communication apparatus of any one of features (15) to (17), in which
the communication apparatus receives the trigger frame sent ahead of a downlink signal from the base station.

(19) The communication apparatus of any one of features (15) to (18), in which
the communication apparatus receives a downlink signal from the base station after having sent a transmission refrainment frame in response to the trigger frame.

(20) The communication apparatus of any one of features (15) to (19), in which
the communication apparatus does not send any transmission refrainment frame in a case where interference is received only from an interference source connected to a base station in a surrounding area whose radio wave utilization status can be found out.

(21) A communication method including:
a step of receiving a trigger frame that induces transmission of a transmission refrainment frame; and
a step of sending a transmission refrainment frame with a transmission parameter specified by the trigger frame.

REFERENCE SIGNS LIST

600 Communication apparatus
601 Data processing section
602 Control section
603 Communication section
604 Power supply section
611 Modulation/demodulation section
612 Signal processing section
614 Wireless interface section
615 Amplification section
616 Antenna

The invention claimed is:

1. A communication apparatus configured to operate as a base station in a communication system, the communication apparatus comprising:
a transceiver that wirelessly sends and receives frames; and
control circuitry operatively connected to the transceiver, wherein the control circuity:
receives a measurement report from a mobile terminal subordinate to the base station, the measurement report including:
an interference power of a second mobile terminal measured by the mobile terminal, the second mobile terminal subordinate to a second base station that does not coordinate operations with the base station, and
an identification of the second mobile terminal,
determines a protection area of the mobile terminal based on the measurement report and a location of the mobile terminal, the protection area characterized by parameters comprising a trigger response transmission power and a second mobile terminal uplink transmission disablement duration,
transmits a trigger frame to the mobile terminal, the trigger frame including the parameters and the identification of the second mobile terminal,
in response to the trigger frame, receives a trigger response frame transmitted by the mobile terminal to the base station and the second mobile terminal, the trigger response frame including the identification of the second mobile terminal and the second mobile terminal uplink transmission disablement duration, the trigger response frame transmitted in accordance with the trigger response transmission power specified in the trigger frame, and
transmits a downlink signal to the mobile terminal during the second mobile terminal uplink transmission disablement duration.

2. The communication apparatus of claim 1,
wherein the protection area is further determined based on a scheduling announcement received from another base station that does cooperate with the base station, and
wherein the downlink signal is transmitted to the mobile terminal during the second mobile terminal uplink transmission disablement duration and in accordance with the scheduling announcement.

3. A communication method performed by a communication apparatus configured to operate as a base station in a communication system, the method comprising:
receiving a measurement report from a mobile terminal subordinate to the base station, the measurement report including:
an interference power of a second mobile terminal measured by the mobile terminal, the second mobile terminal subordinate to a second base station that does not coordinate operations with the base station, and
an identification of the second mobile terminal;
determining a protection area of the mobile terminal based on the measurement report and a location of the mobile terminal, the protection area characterized by parameters comprising a trigger response transmission power and a second mobile terminal uplink transmission disablement duration;
transmitting a trigger frame to the first mobile terminal, the trigger frame including the parameters and the identification of the second mobile terminal;
in response to the trigger frame, receiving a trigger response frame transmitted by the mobile terminal to the base station and the second mobile terminal, the trigger response frame including the identification of the second mobile terminal and the second mobile terminal uplink transmission disablement duration, the trigger response frame transmitted in accordance with the trigger response transmission power specified in the trigger frame; and
transmitting a downlink signal to the mobile terminal during the second mobile terminal uplink transmission disablement duration.

4. The method of claim 3,
wherein the protection area is further determined based on a scheduling announcement received from another base station that does cooperate with the base station, and
wherein the downlink signal is transmitted to the mobile terminal during the second mobile terminal uplink transmission disablement duration and in accordance with the scheduling announcement.

5. A communication apparatus configured to operate as a mobile terminal subordinate to a base station in a communication network, the communication apparatus comprising:
a transceiver that wirelessly sends and receives frames; and
control circuitry operatively connected to the transceiver, wherein the control circuitry:
measures an interference power from a second mobile terminal subordinate to a second base station that does not coordinate operations with the base station and generates a measurement report that includes the interference power and an identification of the second mobile terminal, transmits the measurement report to the base station, receives a trigger frame from the base station, the trigger frame including parameters determined by the base station based on the measurement report, the parameters comprising the identification of the second mobile terminal, a trigger response transmission power, and a second mobile terminal uplink transmission disablement duration, in response to the trigger frame, transmit a trigger response frame to the base station and the second mobile terminal, the trigger response frame including the identification of the second mobile terminal and the second mobile terminal uplink transmission disablement duration, the trigger response frame transmitted in accordance with the trigger response transmission power specified in the trigger frame, and receive a downlink signal from the base station during the second mobile terminal uplink transmission disablement duration.

6. A communication method performed by a communication apparatus configured to operate as a mobile terminal subordinate to a base station in a communication network, the method comprising:

measuring an interference power from a second mobile terminal, subordinate to a second base station that does not coordinate operations with the base station, and generating a measurement report that includes the interference power and an identification of the second mobile terminal;

transmitting the measurement report to the base station;

receiving a trigger frame from the base station, the trigger frame including parameters determined by the base station based on the measurement report, the parameters comprising the identification of the second mobile terminal, a trigger response transmission power, and a second mobile terminal uplink transmission disablement duration;

in response to the trigger frame, transmitting a trigger response frame to the base station and the second mobile terminal, the trigger response frame including the identification of the second mobile terminal and the second mobile terminal uplink transmission disablement duration, the trigger response frame transmitted in accordance with the trigger response transmission power specified in the trigger frame; and receiving a downlink signal from the base station during the interfering terminal uplink transmission disablement duration.

\* \* \* \* \*